United States Patent
Kurizoe et al.

(10) Patent No.: US 9,568,673 B2
(45) Date of Patent: Feb. 14, 2017

(54) DRY FILM FOR OPTICAL WAVEGUIDES, OPTICAL WAVEGUIDE USING SAME, PHOTOELECTRIC COMPOSITE WIRING BOARD USING SAME, AND METHOD FOR PRODUCING PHOTOELECTRIC COMPOSITE WIRING BOARD

(71) Applicant: PANASONIC INTELLECTUAL PROPERTY MANAGEMENT CO., LTD., Osaka (JP)

(72) Inventors: Junko Kurizoe, Osaka (JP); Naoyuki Kondo, Osaka (JP); Toru Nakashiba, Osaka (JP); Shingo Yoshioka, Osaka (JP); Shinji Hashimoto, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/764,721

(22) PCT Filed: Dec. 3, 2013

(86) PCT No.: PCT/JP2013/007103
§ 371 (c)(1),
(2) Date: Jul. 30, 2015

(87) PCT Pub. No.: WO2014/125538
PCT Pub. Date: Aug. 21, 2014

(65) Prior Publication Data
US 2015/0370016 A1 Dec. 24, 2015

(30) Foreign Application Priority Data
Feb. 12, 2013 (JP) .................. 2013-023976

(51) Int. Cl.
*G02B 6/12* (2006.01)
*G02B 6/122* (2006.01)
(Continued)

(52) U.S. Cl.
CPC ................. *G02B 6/122* (2013.01); *G02B 1/12* (2013.01); *G02B 6/1221* (2013.01); *G02B 6/132* (2013.01); *G02B 6/138* (2013.01)

(58) Field of Classification Search
None
See application file for complete search history.

(56) References Cited

U.S. PATENT DOCUMENTS 6,663,946 B2 * 12/2003 Seri .................. H01L 23/49894
174/250
7,916,992 B2 * 3/2011 Eriyama ................ G02B 6/138
385/129

(Continued)

FOREIGN PATENT DOCUMENTS

JP 06-258537 9/1994
JP 2009-104084 5/2009
(Continued)

OTHER PUBLICATIONS

International Search Report issued PCT/JP2013/007103, dated Mar. 4, 2014.

*Primary Examiner* — Rhonda Peace
(74) *Attorney, Agent, or Firm* — Greenblum & Bernstein, P.L.C.

(57) ABSTRACT

The present invention relates to a dry film for optical waveguides, obtained through sequential stacking of a carrier film, a plating adhesion layer, an uncured cladding layer and a cover film. Solid microparticles are dispersed in a resin composition that constitutes the plating adhesion layer.

11 Claims, 5 Drawing Sheets

(51) Int. Cl.
*G02B 6/138* (2006.01)
*G02B 1/12* (2006.01)
*G02B 6/132* (2006.01)

(56) References Cited

U.S. PATENT DOCUMENTS

| | | | | |
|---|---|---|---|---|
| 8,524,841 | B2* | 9/2013 | Nakamura | C08L 63/00 525/476 |
| 9,005,740 | B2* | 4/2015 | Kondo | G02B 6/1221 156/330 |
| 2004/0212030 | A1* | 10/2004 | Asai | G02B 6/12002 257/432 |
| 2007/0065639 | A1* | 3/2007 | Iida | H05K 3/1266 428/141 |
| 2007/0147767 | A1* | 6/2007 | Nonaka | G02B 6/1221 385/142 |
| 2007/0185300 | A1* | 8/2007 | Kojima | C08F 299/065 528/44 |
| 2008/0085985 | A1* | 4/2008 | Nakamura | C08L 63/00 528/25 |
| 2008/0226245 | A1* | 9/2008 | Higuchi | C08G 18/0823 385/127 |
| 2009/0317043 | A1* | 12/2009 | Eriyama | G02B 6/138 385/129 |
| 2010/0129045 | A1* | 5/2010 | Shibata | C09J 7/0246 385/141 |
| 2011/0118405 | A1* | 5/2011 | Suzuki | C08F 299/065 524/533 |
| 2012/0033913 | A1* | 2/2012 | Kondou | C08G 59/226 385/14 |
| 2014/0004321 | A1* | 1/2014 | Kondo | G02B 6/1221 428/195.1 |
| 2015/0234095 | A1* | 8/2015 | Kondo | G02B 1/048 385/123 |
| 2015/0370016 | A1* | 12/2015 | Kurizoe | G02B 6/1221 385/14 |

FOREIGN PATENT DOCUMENTS

| | | |
|---|---|---|
| JP | 2011-232676 | 11/2011 |
| JP | 2012-103381 | 5/2012 |
| WO | 2006/008995 | 1/2006 |

\* cited by examiner

DRY FILM FOR OPTICAL WAVEGUIDES, OPTICAL WAVEGUIDE USING SAME, PHOTOELECTRIC COMPOSITE WIRING BOARD USING SAME, AND METHOD FOR PRODUCING PHOTOELECTRIC COMPOSITE WIRING BOARD

TECHNICAL FIELD

The present invention relates to a dry film for optical waveguides having high transparency and plating adhesion. The present invention also relates to an optical waveguide and a photoelectric composite wiring board that use such a dry film, and to a method for producing the photoelectric composite wiring board.

BACKGROUND ART

Optical fibers have become mainstream as a transmission medium in the field of FTTHs (Fiber to the Home) and long-distance and medium-distance communication in the automotive field. Recent years have witnessed a growing need for high-speed transmission in which light is used also in short distances up to 1 m. Suitable for this region are optical waveguide-type optical wiring boards that have high-density wiring (for instance, with narrow pitch, high branching, more intersections and higher layer counts), are amenable to surface mounting and integration with electrical boards, and are bendable in a small radius, these properties not being achieved by optical fibers.

In broad terms, optical wiring boards have to meet the following two requirements. Firstly, optical wiring boards are substitutes for printed wiring boards (PWBs). Secondly, optical wiring boards are substitutes for flexible printed boards (FPCs) that are used in hinges of small terminal devices.

In both types, low-speed signal transmission and electrical wiring are essential for operating, for instance, VCSELs (Vertical Cavity Surface Emitting Lasers), PDs (Photo Diodes) and ICs, which are light-emitting and receiving elements. Accordingly, the ideal configuration of an optical wiring board is herein an optical-electric composite wiring board that is a combination of an optical circuit and an electrical circuit (for instance, Patent literature 1).

In a photoelectric composite wiring board that combines an optical circuit and an electrical circuit, light must be inputted and outputted to/from by light-emitting element and a light-receiving element in the optical circuit. Accordingly, the optical circuit must be disposed on the surface layer of an electrical circuit multilayer substrate, and be disposed in such a manner that various chips can be mounted of the optical circuit.

In a case where an optical circuit is formed on an electrical circuit board that is provided in order to mount various types of chip, however, the already-formed electrical circuit that is provided in order to mount various types of chip becomes covered when there is used a non patternable optical circuit forming material that is applied over the entire surface and is then cured. Accordingly, mounting must take place after removal, by laser or by machining in a later step, of the material for the optical circuit that covers the electrical circuit. This translates into poorer productivity, and is thus problematic.

Alternatively, in a case where an optical circuit is formed on the electrical circuit multilayer substrate that has no electrical circuit, and that has formed therein only through-holes for electrical connection with an underlying layer, with no electrical circuit in the outermost layer, and where a further electrical circuit is to be formed, on the optical circuit, for chip mounting, then numerous through-holes must be formed for electrical connection with the underlying electrical circuit, after formation of the electrical circuit on the optical circuit, in particular when a non-patternable optical circuit forming material is used. This makes for very poor productivity.

A conceivable approach, other than the above methods, involves laminating, on an electrical circuit board, an optical circuit that is produced using a non-patternable optical circuit forming material. In this case, however, the electrical circuit and the optical circuit are produced in different processes, and, accordingly, an adhesive is required, and the optical circuit has to be aligned. Productivity is impaired in this instance as well.

In order to solve the above problems, it is useful to impart patternability, and adhesion by plating, to an optical wiring material itself. A conceivable method to that end involves adding, for instance, inorganic particles or rubber particles to the optical wiring material. It is however difficult to add large amounts of inorganic particles, rubber particles or the like to optical wiring materials, from which high transparency is demanded, and no such materials are known as yet.

Meanwhile, using a dry film for optical waveguides is a known feature in order to easily form an optical waveguide on a substrate. Hitherto known dry films for optical waveguides include dry films that have a base film and at least two photosensitive resin layers that exhibit different refractive indices after curing (for instance, Patent literature 2).

The dry film disclosed in Patent literature 2, however, does not address the issue of combining transparency and adhesion; also, the object of Patent document 2 is not imparting the surface layer of the dry film with adhesion towards plating.

Therefore, it is an object of the present invention to provide a dry film for optical waveguides that can be patterned and that allows realizing both transparency and plating adhesion, and to provide an optical waveguide and a photoelectric composite wiring board that use the dry film for optical waveguides, and a method for producing a photoelectric composite wiring board in which the dry film is used.

CITATION LIST

Patent Literature

Patent literature 1: Japanese Unexamined Patent Publication No. 2009-104084
Patent literature 2: Japanese Unexamined Patent Publication No. H6-258537

SUMMARY OF INVENTION

As a result of diligent research aimed at solving the above problems, the inventors found that problems such as those described above can be solved by a dry film in which a plating adhesion layer that combines patternability, plating adhesion and transparency is formed on a cladding.

Specifically, a dry film for optical waveguides according to one aspect of the present invention is characterized in that a carrier film, a plating adhesion layer, an uncured cladding layer and a cover film are stacked in this order, and solid microparticles are dispersed in a resin composition that constitutes the plating adhesion layer.

DESCRIPTION OF EMBODIMENTS (Dry Film for Optical Waveguides)

An embodiment for carrying out the present invention will be explained next in specific terms.

Figure 1:
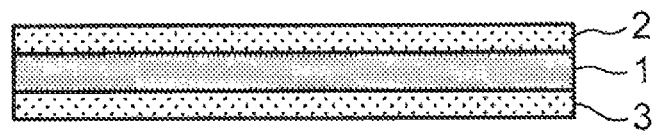
FIG. 1 is a cross-sectional schematic diagram of a conventional dry film for optical waveguides.
Figure 2A:
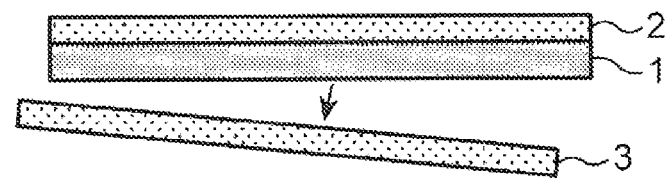
FIG. 2A to 2D are schematic diagrams illustrating a process of bonding a conventional dry film for optical waveguides to a substrate.
Figure 2B:
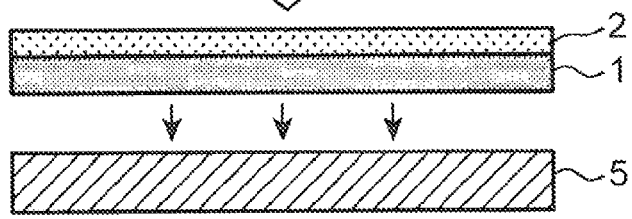
Figure 2C:
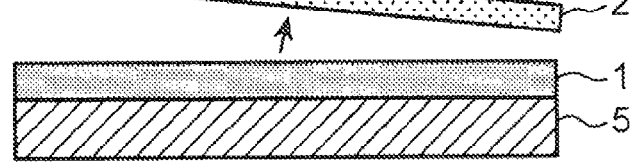
Figure 2D:

A conventional film for optical waveguides has a structure wherein a solid-form transparent resin (optical material, for instance a cladding layer 1), being a material for optical waveguides. is sandwiched between two films (a carrier film 2 and a cover film 3), as illustrated in FIG. 1.

In a conventional dry film for optical waveguides, a protective film (OPP film in a conventional example) referred to as the cover film 3 is stripped off, and the dry film is thermally pressure-bonded to a substrate, for instance in a vacuum laminator, as illustrated in FIG. 2A to 2D; thereafter, the material is cured and modified, as needed, and the carrier film 2 (PET film in the conventional example) is stripped off, as a result of which there is formed a layer of the material alone. The formed layer is used as a cladding layer 1 (or core layer) for optical wiring.

The portion of desired plating adhesion is the surface layer portion after stripping of the carrier film. In particular, the portion from which plating adhesion is required is a material for cladding at the outermost surface layer. Therefore, the inventors found that if a layer having plating adhesion is sandwiched between the carrier film and the optical waveguide material layer (cladding layer), then a material having adhesion is exposed at the surface layer, after stripping of the carrier film, such that surface layer plating adhesion can be secured.

Figure 3A:
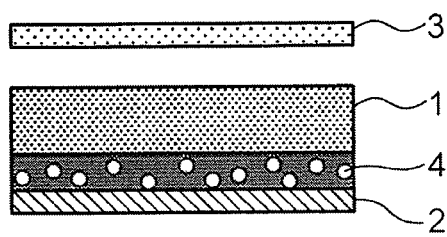
FIG. 3A to 3C are schematic diagrams illustrating one embodiment of a dry film for optical waveguides of the present invention, and illustrating one embodiment of the process of bonding the dry film for optical waveguides of the present invention to a substrate.

As a characterizing feature of the dry film for optical waveguides according to the present embodiment, specifically, the dry film for optical waveguides is obtained through sequential stacking of a carrier film 2, a plating adhesion layer 4, an uncured cladding layer 1 and a cover film 3, and solid microparticles are dispersed in a resin composition that constitutes the plating adhesion layer 4, as illustrated in FIG. 3A.

A layer having plating adhesion can be formed on the cladding layer by using thus a resin composition having solid microparticles dispersed therein. Specifically, it is deemed that adhesion between the cladding layer (optical layer) and the plating layer, via the plating adhesion layer, is achieved, thanks to the anchoring irregularities that are formed, given that the etching rates during a chemical treatment of the resin and solid microparticles (for instance, silica particles) are different. Accordingly, the dry film for optical waveguides of the present embodiment is advantageous in making it possible to secure transparency and plating adhesion with a surface layer of an optical waveguide and/or photoelectric composite wiring board.

Further, at least a film (cladding layer) for waveguides is overlaid in an uncured state. Adhesion between the cladding layer and the plating adhesion layer is likewise achieved as a result. The plating adhesion layer (particle-containing layer) may be laid in an uncured state, or may be laid after curing.

Also in a case where there is used an electrical circuit multilayer substrate in which no electrical circuit is formed on the outermost layer, and in which there are formed only through-holes for electrical connection with an underlying layer, it is possible to form an optical circuit, by exploiting patternability, at predetermined positions on a substrate, and simultaneously therewith, forming, by plating, an electrical circuit on a multilayer substrate and the top face of the optical layer. Productivity becomes yet better as a result.

Firstly, polyethylene terephthalate (PET) is mainly used as the carrier film, but the carrier film is not particularly limited thereto, and a biaxially stretched polypropylene film (OPP), or film of polyethylene naphthalate (PEN), polyimide or the like may be used instead. By contrast, OPP is mainly used as the cover film, but the latter is not particularly limited thereto.

The surface of the carrier film is preferably subjected to a release treatment. The purpose of this is to enable smoother stripping at the interface between the plating adhesion layer and the carrier film during stripping of the carrier film. A commercially available film may be used as such a release film. Specific examples of commercially available release films include, for instance, TN100 by Toyobo Co., Ltd., and WZ by Toray Industries, Inc.

Examples of the material that constitutes the plating adhesion layer include, for instance, a material in which solid microparticles are dispersed in a resin composition.

A curable and transparent resin composition can be used, without particular limitations, as the resin composition that is utilized in the plating adhesion layer.

Preferably, a resin composition is used that is photocurable and has UV transmissivity.

Examples of the resin composition include, besides various epoxy resins, also various oxetane resins, and various compounds having reactive double bonds, such as acrylates and methacrylates. Preferably, a resin composition is used such that the main component whereof is identical to that of the cladding layer described below. That is because exposure and development of the plating adhesion layer and the cladding layer can be then performed at one time. Using a resin composition having, as a main component, the same resin as that of the cladding layer is also advantageous in that, by doing so, the transparency of the cladding layer (optical layer) remains unaffected even when a resin component is mixed at the interface between the plating adhesion layer and the cladding layer.

Preferably, the average particle size of the solid microparticles dispersed in the plating adhesion layer ranges from 0.1 to 5 μm. Particle aggregation is unlikelier to occur, while transparency is easier to secure, if the average particle size is 0.1 μm or greater. It is deemed, moreover, that a sufficient anchor size can be secured as a result of a roughening treatment, such that the adhesion effect can be brought out reliably. An average particle size of 5 μm or less is advantageous in that the thickness of the resulting dry film can be made smaller in that case.

Preferably, the amount of solid microparticles in the resin composition that constitutes the plating adhesion layer ranges from about 20 to 50 mass %. A sufficient effect of enhancing plating adhesion, while readily maintaining transparency, can be achieved within that range.

The solid microparticles can be dispersed by being added to the resin composition that constitutes the plating adhesion layer, followed by stirring at about 3000 to 6000 rpm, for 1 to 2 hours, using for instance a disperser or the like, and subsequent dispersing using a bead mill or the like.

As specific solid microparticles there can be used, for instance, an oxide such as silica, zirconium (Zr), titanium (Ti), tin (Sn) or the like, or polymer microparticles or polymeric microparticles such as rubber particles. The foregoing can be used singly or concomitantly in combinations of two or more types.

Preferred among the foregoing are silica particles, since the refractive index thereof is close to that of epoxy resins.

Commercially available products can be used herein as the silica particles. Specific examples thereof include, for instance, SOC2 (SO25R) by Admatechs (median diameter 0.5 μm), SFP-130MC by Denka (median diameter 0.7 μm), FB-1SDX by Denka (median diameter 1.8 μm), SS-04 by Tokuyama (central particle size 0.4 μm), SS-07 by Tokuyama (central particle size 0.7 μm), and SS-15 by Tokuyama (central particle size 1.5 μm). The foregoing can be used singly, or concomitantly in combinations of two or more types.

The silica that is used may have had the surface thereof subjected to a surface treatment with epoxysilane or the like.

Using polymer microparticles or polymeric microparticles, such as rubber particles, can be expected to result in greater peeling surface area, and greater adhesion, through elongation of the particles.

Specific examples of the rubber particles or the like that can be used include particles formed from copolymers of acrylic (acrylate, methacrylate) monomers, styrenic monomers and vinylic monomers. Apart from the foregoing, transparent particles etched as a result of a permanganate treatment process can be used as well.

Commercially available products can be used herein as the rubber particles or the like. Specific examples thereof include, for instance, METABLEN KW4426 (0.1 μm), being core-shell-type particles, W300 (0.1 μm), being core-shell-type particles, and W450A (0.2 μm), being acrylic rubber particles, by Mitsubishi Rayon, and XSK500 (0.5 μm), being acrylic rubber particles, by JSR.

Rubber particles and inorganic solid microparticles such as silica particles can be concomitantly used as the solid microparticles of the present embodiment. The blending amount of rubber particles, when used concomitantly with 20 to 50 mass % of silica particle, ranges appropriately from about 2 to 5 mass %, from the viewpoint of transparency and the like.

Such solid microparticles are dispersed in the resin composition that constitutes the plating adhesion layer; as a result, a dry film for optical waveguides can be obtained that exhibits excellent plating adhesion.

Next, a material having thermal reactivity or photoreactivity, such as an epoxy, phenoxy, acrylic or acrylate material, and which is solid at normal temperature, can be appropriately used as an optical waveguide material for a cladding layer, so long as the material is a transparent resin having a refractive index lower than that of the optical waveguide material as used in a core layer. In the present embodiment, the term light denotes energy rays typified by ultraviolet rays. Further, photoreactivity denotes a property whereby, for instance, curing and changes in refractive index, or changes in solubility towards specific liquids, occur as a result of being struck by energy rays. Thermal reactivity denotes a property whereby, for instance, curing and changes in refractive index, or changes in solubility towards specific liquids, occur as a result of heating.

Preferably, the optical waveguide material for a cladding layer used in the present embodiment has a property whereby the cladding layer is cured by energy rays. That is because the optical waveguide material for a cladding layer can be patterned by irradiating energy rays onto necessary portions alone, to cure these portions, and by removing, using a developer, portions that have not been irradiated with the energy rays. More preferably, the resin contained in the cladding layer is photocurable, and yet more preferably, is identical to the resin that is contained in the resin composition that forms the plating adhesion layer. Incorporating the same resin is advantageous in that, by doing so, adhesion between the plating adhesion layer and the cladding layer material is made yet better, through simultaneous curing, and also in that the process is simplified thereby. A further advantage is that the transparency of the cladding layer (optical layer) remains unaffected, even when a resin component is mixed in the interface of the plating adhesion layer and the cladding layer.

More specifically, the optical waveguide material for a cladding layer that is used to form the cladding layer in the present embodiment is a material that is formed by an epoxy resin composition that contains a 1,2-epoxy-4-(2-oxiranyl) cyclohexane adduct of 2,2-bis(hydroxymethyl)-1-butanol, a bisphenol-type epoxy resin, a phenoxy resin and a cationic curing initiator.

Incorporating the 1,2-epoxy-4-(2-oxiranyl)cyclohexane adduct of 2,2-bis(hydroxymethyl)-1-butanol makes it possible to lower the refractive index of the cladding layer, to increase transparency, and to reduce optical loss. Further, the tackiness of a curable film can be adjusted downward, while the Tg of the resulting cured product can be adjusted upward. The content of the 1,2-epoxy-4-(2-oxiranyl)cyclohexane adduct of 2,2-bis(hydroxymethyl)-1-butanol ranges preferably from 30 to 70 mass % with respect to the total resin component amount, since the curable film becomes brittle, and handleability impaired, when the content is excessively large.

Incorporating the bisphenol-type epoxy resin allows adjusting downward the Tg of the cured product, thereby reducing the brittleness of the cured product, while increasing the transparency of the cured product, and reducing optical loss. Liquid resins at normal temperature and solid resins at normal temperature can both be used as the bisphenol-type epoxy resin. Therefore, the tackiness of the curable film can be increased by using a liquid resin, the tackiness of the curable film can be lowered by using a solid resin, and thus the tackiness of the curable film can both be adjusted accordingly. Preferably, the content of the bisphenol-type epoxy resin ranges from 10 to 30 mass % with respect to the total resin fraction amount.

Examples of the bisphenol-type epoxy resin that can be used include bisphenol A-type epoxy resins, bisphenol F-type epoxy resins, bisphenol E-type epoxy resins, bisphenol S-type epoxy resins and the like.

Incorporating the above phenoxy resin makes it possible to suppress brittleness of the cured product and increase the toughness of the cladding, while adjusting the Tg downward, and allows increasing the refractive index, increasing transparency, and reducing optical loss. Moreover the viscosity of the solvent solution (varnish) that is prepared to produce the curable film can be adjusted upward, the curable film can be produced easily, and the tackiness of the curable film can be adjusted to be kept low. Preferably, the content of phenoxy resin ranges from 10 to 25 mass % with respect to the total resin fraction amount, since an excessively large content of the phenoxy resin results in higher varnish thixotropy, and, accordingly, in inappropriate coatability during production of the curable film.

Cladding transparency can be increased and optical loss can be reduced by incorporating a cationic curing initiator, as described above, as a curing initiator for imparting curability to the epoxy resin composition. The cationic curing agent may be a photocationic curing initiator capable of initiating curing by light alone, a thermal cationic curing initiator capable of initiating curing by heat alone, or a photo-thermal cationic curing initiator capable of initiating curing both by light and by heat, but any one of the foregoing can be used, singly or concomitantly in combinations of a plurality of types. The content of the cationic curing agent is set as needed, but preferably ranges generally from 0.5 to 2 mass % with respect to the total resin fraction amount.

In addition to the above components, the epoxy resin composition for producing a curable film for cladding formation contains preferably an epoxy resin of Formula (1). In this case, preferably, a thermal cationic curing initiator and a photocationic curing initiator are concomitantly used as the cationic curing initiator.

[Chemical Formula 1]

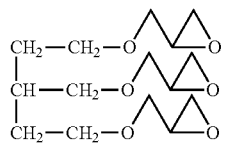

(1)

The epoxy resin of Formula (1) is a trimethylol propane-type epoxy resin, of very high transparency, that allows reducing the optical loss of the optical waveguide through formation of a high-transparency cladding. When the epoxy resin composition contains the epoxy resin of Formula (1), it becomes possible to obtain a curable film having excellent lamination properties and that can be used over long periods of time, and in which resin curing does not proceed readily in a drying process, in the production of a curable film through application of a varnish of an epoxy resin, even when the epoxy resin composition contains a thermal cationic curing initiator as the cationic curing initiator. By using concomitantly a thermal cationic curing initiator and a photocationic curing initiator, as the cationic curing initiator of the epoxy resin composition that contains the epoxy resin of Formula (1), it becomes moreover possible to prevent the occurrence of insufficient curing, through subsequent thermal curing, by heating, of portions that might have been insufficiently photo-cured due to not having been irradiated with light upon formation of a cladding through lamination, onto a core, of a curable film produced out of the epoxy resin composition, followed by curing by exposure; it becomes accordingly possible to form an optical waveguide that exhibits yet smaller loss of light, thanks to an increased adhesion between core and cladding. Preferably, the compounding amount of the epoxy resin of Formula (1) ranges from 3 to 25 mass % with respect to the total resin component amount. If the compounding amount is smaller than 3 mass %, the effect elicited by formulating the epoxy resin may fail to be achieved, while a compounding amount in excess of 25 mass % gives rise to excessive tackiness of the curable film, which is undesirable. The ratio of the thermal cationic curing initiator and the photocationic curing initiator when the foregoing are used concomitantly is preferably set so that the thermal cationic curing initiator is 20 to 80 mass %. Thermal curing of the portions that are not photo-cured is insufficient when the thermal cationic curing initiator is less than 20 mass %, whereas sufficient photocuring cannot be elicited when the thermal cationic curing initiator exceeds 80 mass %.

In addition to the above components, the epoxy resin composition for forming a cladding layer preferably contains an epoxy resin that is liquid at room temperature and that has a plurality of 3,4-epoxycyclohexenyl structures per molecule. In this case, preferably, a photocationic curing initiator alone is used as the cationic curing initiator.

An epoxy resin having a 3,4-epoxycyclohexenyl skeleton exhibits very high transparency, and allows forming a cladding that is highly transparent and has a low refractive index, and producing an optical waveguide having little optical loss. Further, such an epoxy resin has a structure referred to as internal epoxy, and hence the resin readily undergoes cationic curing, and can be sufficiently cured in a short time. Moreover, a curable film of high tackiness can be obtained, the Tg of the resin can be increased or reduced in accordance with the molecular structure, and the Tg of the cured product can be accordingly adjusted. In a case where a photocationic curing initiator alone is used as the cationic curing initiator when this epoxy resin having a 3,4-epoxycyclohexenyl skeleton is incorporated in the epoxy resin composition, the waveguide loss of the optical waveguide is rendered very low through lamination, onto the core, of a curable film produced out of the epoxy resin composition, curing by exposure, and formation of the cladding by thermal after-curing. The compounding amount of the epoxy resin having a 3,4-epoxycyclohexenyl skeleton ranges preferably from 5 to 50 mass % with respect to the total resin component amount.

For instance, 3,4-epoxycyclohexenylmethyl-3',4'-epoxycyclohexene carboxylate or ε-caprolactone-modified 3,4-epoxycyclohexenylmethyl-3',4'-epoxycyclohexane carboxylate can be used as the epoxy resin having a 3,4-epoxycyclohexenyl skeleton.

The epoxy resin composition for forming a cladding layer can further contain various epoxy resins, various oxetane resins, various compounds having reactive double bonds, such as acrylates and methacrylates, and various liquid or solid rubber-like materials, so long as the scope of the present invention is not departed from. The epoxy resin composition can also contain sensitizers, surface conditioners (leveling agents, antifoaming agents, repellency inhibitors) or the like.

The dry film for optical waveguides of the present embodiment in which the above various compositions are utilized can be produced, for instance, as follows.

A varnish for the plating adhesion layer is produced first (preferably, an optical waveguide material for a cladding layer such as the one described above is used herein as the material of the varnish). The solid microparticles such as silica, of a predetermined size, are blended into the varnish. Preferably, the resulting varnish is filtered before use. For instance a membrane filter having a pore diameter of about 10 μm can be used herein for filtering. This allows removing aggregated particles.

The obtained mixed varnish is applied onto the carrier film 2 (for instance, of PET), followed by drying, to remove the solvent. A solid-form plating adhesion layer 4 is laid as a result on the carrier film.

The thickness of the plating adhesion layer 4 that is formed at this time is an important factor. A mounting pad is formed, by plating, on the plating adhesion layer, such that an optical component is mounted on the mounting pad. When the plating adhesion layer is excessively thick, however, the distance between the component and the mirror increases, and the usefulness of circuit formation by plating is lost. In a case where the optical material is of ultraviolet-curable type, an excessively thick plating adhesion layer is problematic in that ultraviolet rays may fail to pass therethrough. On the other hand, an excessively thin plating adhesion layer precludes sufficient roughening, and may result in impaired plating adhesion. Accordingly, the thickness of the plating adhesion layer ranges preferably from 1 to 10 μm, more preferably from 2 to 5 μm.

Thereafter, a cladding layer varnish is prepared using an optical waveguide material for a cladding layer such as the one described above, and the cladding layer varnish is applied, to a desired thickness, on the plating adhesion layer 4. The whole is then dried to evaporate off the solvent from the applied varnish, and yield thereby the cladding layer 1. Lastly, the dry film is completed (FIG. 3A) by affixing for instance an OPP film as the cover film 3.

The thickness of the obtained dry film as a whole ranges from about 10 to 100 μm. The dry film can then be used to produce an optical waveguide and/or a photoelectric composite wiring board.

The dry film of the present embodiment is excellent in patternability, transparency and plating adhesion. By using the dry film, therefore, it becomes possible to simplify a production process, and to reduce the distance between an electrical circuit and an optical waveguide core. Coupling loss with a chip can be likewise curtailed as a result.

(Method for Producing an Optical Waveguide and a Photoelectric Composite Wiring Board)

A superior optical waveguide and/or photoelectric composite wiring board can be produced using the obtained dry film for optical waveguides.

Specifically, the method for producing a photoelectric composite wiring board according to the present embodiment includes at least a stacking step of stacking the dry film on a substrate on which a cladding and a core of an optical waveguide are formed; a curing step of curing the plating adhesion layer and the uncured cladding layer; a developing step of developing simultaneously the plating adhesion layer and the cladding layer; a roughening step of roughening the surface of the plating adhesion layer; and a circuit formation step of forming an electrical circuit.

One embodiment of the production method will be explained next with reference to FIGS. 3 to 5.

Firstly, a process previous to production of the photoelectric composite wiring board according to the present embodiment is performed, up to core patterning for an optical waveguide, using a base substrate in the form of an electrical printed board, a glass substrate, or a plastic substrate. Specifically, an optical waveguide material for a cladding layer and an optical waveguide material for a core layer are produced first. For instance, the material disclosed in Japanese Unexamined Patent Publication No. 2009-104084 can be used herein as the optical waveguide material for a core layer.

A material for a cladding is affixed to a base substrate 5, followed as needed by irradiation of ultraviolet rays or the like, via a photomask, and developing, to form a lower cladding layer 7. A material for a core is affixed to the lower cladding layer 7, followed as needed by irradiation of energy rays, for instance ultraviolet rays, via a photomask, and developing, to form thereby a pattern of a core 6.

Figure 3B:
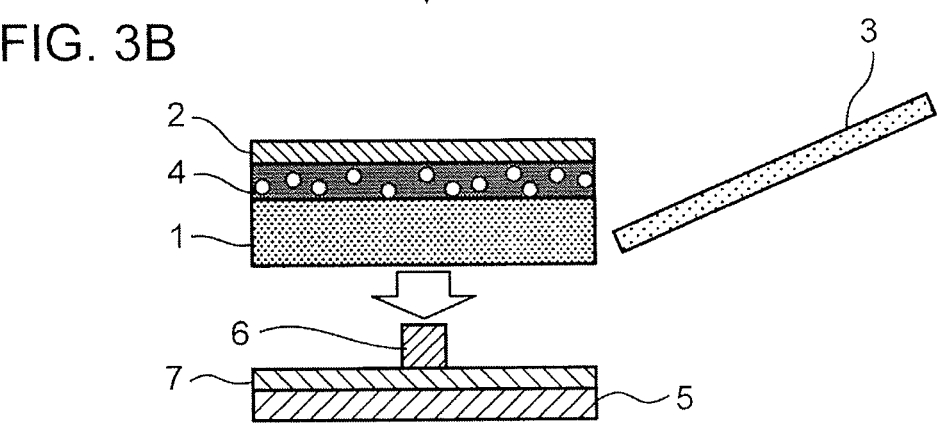
Figure 4A:
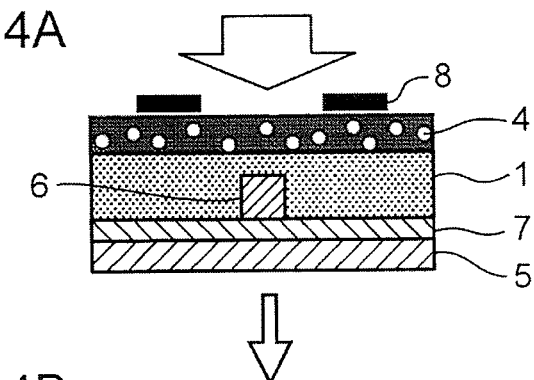
FIG. 4A to 4C are schematic diagrams illustrating one embodiment, from a curing step up to a roughening step, in a production process of the dry film for optical waveguides of the present invention.

The cover film 3 is stripped off the dry film according to the present embodiment, and the dry film is placed and affixed to the obtained substrate above, having been processed up to core patterning, in such a manner that the cladding layer 1 of the dry film is in contact with the substrate (FIG. 3B). Affixing can be accomplished herein by pressing and heating, using for instance a vacuum laminator or a vacuum press.

Figure 3C:
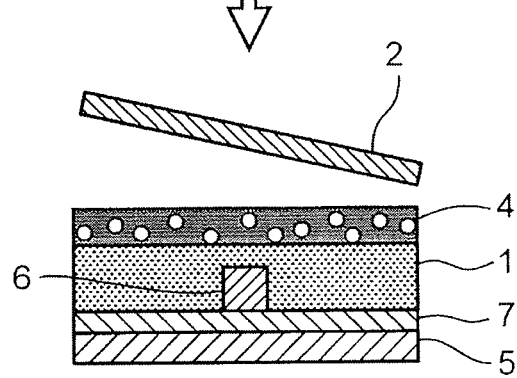

Thereafter, the carrier film 2 is stripped off, to yield thereby (stacking step) a substrate being a sequential stack of the base substrate 5, the patterned core 6, the uncured cladding layer 1 that covers the core 6, and the plating adhesion layer 4 (FIG. 3C).

Processing of the cladding layer material and primary curing of the plating adhesion layer material are performed next (curing step).

Primary curing of the plating adhesion layer material and the cladding layer material may involve, for instance, photocuring (irradiation of ultraviolet rays) (FIG. 4A), but is not limited thereto, and may involve thermal curing.

In a case where a resin composition containing a resin different from that of the cladding layer is used as the plating adhesion layer material (i.e. in a case where primary curing is not performed simultaneously), either one of the cladding layer material and the plating adhesion layer material may be treated first. When a process ancillary to developing, such as patterning, is to be carried out, it is however preferable to perform primary curing of the plating adhesion layer material before developing, due to the concern of resistance to developing of the uncured plating adhesion layer material.

Figure 4B:
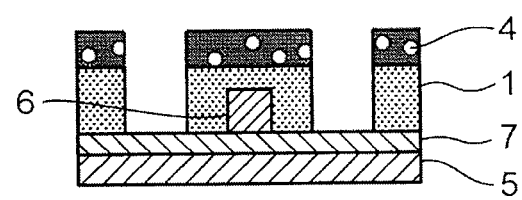
Figure 4C:
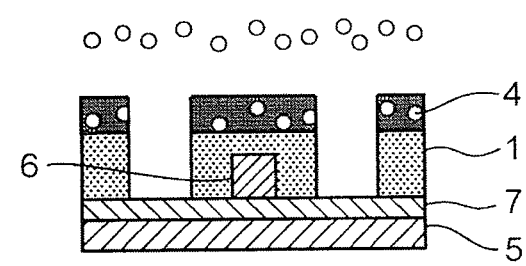

Next, a developing process is performed at a temperature ranging from about room temperature to warm temperature (about 50° C.), in an ultrasonic cleaner, using a developer such as a water-based flux cleaning agent (developing step), to remove thereby the resin in uncured portions (FIG. 4B).

At this time, the plating adhesion layer material, in a cured state, overlays the cladding layer material, in a state resulting from removal by the developer. Although the plating adhesion layer material is broken and removed through ultrasonic vibration in the developer, the plating adhesion layer material cannot be removed cleanly if the thickness of the latter is excessively large. In the present embodiment the above problem does not arise since the thickness of the plating adhesion layer is 10 μm or less.

Next, the substrate having undergone the photo-thermal treatment of the cladding layer material, plating, and primary curing of the plating adhesion layer material, is then subjected to a roughening treatment (desmearing) of the plating adhesion layer surface (FIG. 4C) (roughening step). In this step, particles of the solid microparticles included in the plating adhesion layer are sloughed off, and anchors become thus formed on the plating adhesion layer.

The roughening treatment may be carried out for instance through immersion in a roughening solution. The temperature of the roughening solution ranges preferably from 40 to 90° C., and the immersion time from about 1 to 30 minutes. The roughening solution is not particularly limited, so long as the solution contains one or both from among an acid and an oxidizing agent. For instance, the roughening treatment can be accomplished using a an oxidizing agent such as a permanganate salt, for instance potassium permanganate, a dichromate salt, ozone, hydrogen peroxide/sulfuric acid, or nitric acid, or a combination of the foregoing. Roughening may be performed stepwise, by modifying as appropriate the type of roughening solution. For instance, the plating adhesion layer can be etched as a result of a swelling step, a permanganate acid treatment step and a reduction treatment step, whereupon an anchor structure can be formed on the surface of the plating adhesion layer through sloughing off of the solid microparticles.

Further, a roughening solution can be used that is a set of commercially available roughening agents, selected from among three types, namely "Swelling Dip Securiganth P" by Atotech, "Concentrate Compound CP" by Atotech, and "Reduction Solution Securiganth P500", by Atotech. In a case where these three types are used as a set, the roughening treatment (desmearing) using a roughening solution can be performed by immersing firstly the optical substrate in "Swelling Dip Securiganth P", to elicit swelling of the resin, dissolving the resin next by immersing the optical substrate in "Concentrate Compound CP", and immersing the optical substrate lastly in "Reduction Solution Securiganth P500", to elicit neutralization under basic conditions.

Figure 5A:
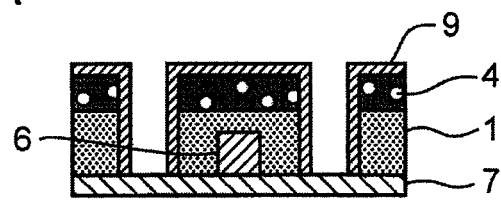
FIG. 5A to 5D are schematic diagrams illustrating one embodiment of a circuit formation step in the production process of the dry film for optical waveguides of the present invention.
Figure 5B:
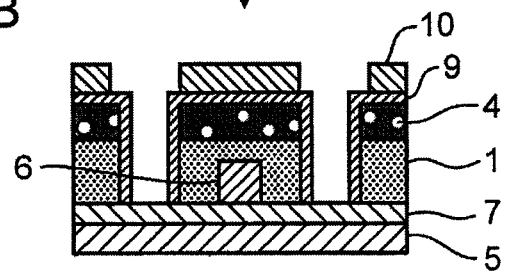
Figure 5C:
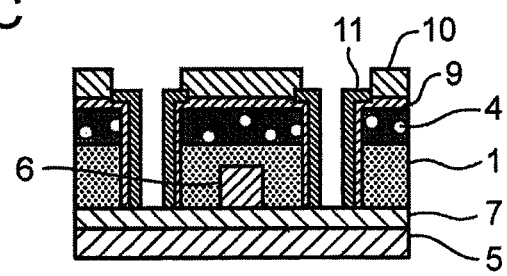
Figure 5D:
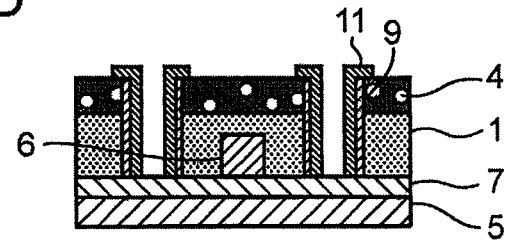

Thereafter, an outer layer circuit is formed (circuit formation step), for instance in accordance with a known additive method, on the surface of the plating adhesion layer having undergone thus a roughening treatment. As a result there can be obtained a photoelectric composite wiring board being a composite of an optical waveguide and an electrical circuit. The additive method may be a full-additive method, or a semi-additive method. The outer layer circuit in the present invention may be formed in accordance with either method. In the case, for instance, of a semi-additive method, the whole is subjected to electroless plating (FIG. 5A; a plating resist 10 is provided at portions at which no circuit is to be formed (FIG. 5B). Then, plating 11 is formed, by electrolytic copper plating (FIG. 5C), after which the plating resist 10 is stripped off, and the electroless plating is removed by flash etching (FIG. 5D).

Through-holes are formed as needed, to elicit electrical connection with the base substrate, via the plating. The through-holes can be opened by drilling or laser, and photovias can also be opened by mask exposure.

The production method of the present embodiment is thus advantageous in that the cladding and the plating adhesion layer can be formed simultaneously, which translates into a simple process of forming an electrical circuit on the optical waveguide surface. The present embodiment further allows reducing the distance between the core of the optical waveguide and the electrical circuit, and reducing coupling loss, without impairing the loss of the optical waveguide. Further, an electrical circuit can be formed, by build-up, on the optical waveguide.

The photoelectric composite wiring board of the present embodiment thus obtained can be preferably used in equipment from which extremely fast signal processing is required, for instance routers, servers, supercomputers and the like.

Features of various implementations have been disclosed above in the present description, but the main features of the foregoing can be summarized as follows.

A dry film for optical waveguides according to one aspect of the present invention is characterized in that a carrier film, a plating adhesion layer, an uncured cladding layer and a cover film are stacked in this order, and solid microparticles are dispersed in a resin composition that constitutes the plating adhesion layer.

Such a configuration elicits the advantage of making it possible to secure patternability and transparency, as well as plating adhesion, of the surface layer of the optical waveguide and/or the photoelectric composite wiring board. Productivity as well is improved by using the dry film of the present invention.

In the dry film for optical waveguides, preferably, the resin composition that constitutes the cladding layer is a photocurable resin composition. This is advantageous, in that, as a result, there is enabled patterning through irradiation of energy rays onto necessary portions alone, to cure these portions, and removal, using a developer, of portions that have not been irradiated with the energy rays.

In the dry film for optical waveguides, preferably, the resin composition that constitutes the plating adhesion layer is a resin composition that is photocurable and has ultraviolet ray transmissivity. This is advantageous, in that, as a result, exposure and development of the cladding layer and the plating adhesion layer can be performed simultaneously.

In the dry film for optical waveguides, preferably, the thickness of the plating adhesion layer ranges from 1 to 10 µm. It is deemed that by using such a dry film, coupling loss with a light-emitting and receiving element that is mounted on the optical waveguide and/or the electrical circuit is reduced, while affording excellent transmittance. As a result, the cladding layer and the plating adhesion layer can be exposed and developed simultaneously yet more reliably.

In the dry film for optical waveguides, preferably, the plating adhesion layer and the cladding layer are constituted of resin compositions having resins of identical composition. This is advantageous in that, as a result, the transparency of an optical layer is unaffected, even if a resin component is mixed in the interface between the cladding layer and the plating adhesion layer.

In the dry film for optical waveguides, preferably, the carrier film has releasability, since operability is better in that case.

In the dry film for optical waveguides, preferably, the cladding layer has a property of being cured by energy rays. That is because, in that case, patterning is enabled through irradiation of energy rays onto necessary portions alone, to cure these portions, and removal, using a developer, of portions that have not been irradiated with the energy rays.

In the dry film for optical waveguides, preferably, the solid microparticles are silica particles. As a result, the refractive indices of the resin and silica contained in the adhesion layer are brought close to each other, and, accordingly, the resin composition exhibits excellent transparency and good patternability. In turn, this superior transmittance of the adhesion layer allows for batch-curing together with the directly underlying cladding layer, which is advantageous.

Another aspect of the present invention encompasses an optical waveguide formed of the dry film, and a photoelectric composite wiring board characterized by being provided with that optical waveguide.

A method for producing a photoelectric composite wiring board in yet another aspect of the present invention, includes at least a stacking step of stacking the dry film on a substrate on which a cladding and a core of an optical waveguide are formed; a curing step of curing the plating adhesion layer and the uncured cladding layer; a developing step of developing simultaneously the plating adhesion layer and the cladding, layer; a roughening step of roughening the surface of the plating adhesion layer; and a circuit formation step of forming an electrical circuit.

The dry film for optical waveguides of the present embodiment has excellent patternability, transparency and plating adhesion, and, accordingly, using the dry film for optical waveguides makes it possible to simplify the production process of a photoelectric composite wiring board, and to reduce the distance between an electrical circuit and an optical waveguide core, as a result of which coupling loss with a chip can be likewise suppressed.

In the production method, more preferably, the resin contained in the cladding layer is identical to the epoxy resin that forms the plating adhesion layer, and in the curing step, the plating adhesion layer and the cladding layer are photocured simultaneously. As a result, adhesion is further improved, and the process can be further simplified.

The present invention will be explained next in more specific terms by way of examples. The present invention is however not limited in any way to the examples below.

EXAMPLES

Example 1

(1) Production of a Dry Film (with Plating Adhesion Layer) for Optical Waveguides Various formulation components, namely 62 parts by mass of EHPE3150 (by Daicel Chemical Industries, Ltd.), as an epoxy resin being an 1,2-epoxy-4-(2-oxiranyl)cyclohexane adduct of 2,2-bis(hydroxymethyl)-1-butanol, 12 parts by mass of Epiclon 850s (by DIC Ltd.), being a liquid bisphenol A-type epoxy resin, 18 parts by mass of YP50 (by Tohto Kasei Co., Ltd.), being a phenoxy resin, 8 parts by mass of Epotohto YH300 (by Tohto Kasei Co., Ltd.), being a trimethylol propane-type epoxy resin, 1 part by mass of SP-170 (by ADEKA Corp.), being a photocationic curing initiator, and 0.1 parts by mass of F470 (by DIC Ltd.), being a surface conditioner, were dissolved in a solvent of 30 parts by mass of toluene and 70 parts by mass of MEK, to prepare an epoxy resin varnish for cladding.

Further, silica particles SS-04, produced by Tokuyama (central particle size 0.4 µm, by Tokuyama) were blended into the varnish to be 30 mass %, and the whole was stirred at 3000 rpm for 1 hour in a disperser, followed by dispersion in a bead mill. The varnish having the particles blended thereinto was filtered using a membrane filter having a pore diameter of 10 µm.

Thereafter, a PET film (part number A4100), by Toyobo Co., Ltd., was coated using a multi-coater having a comma coater head, by Hirano Tecseed. The coated film was dried, and thereafter, the varnish for cladding was further applied, using the same multi-coater, to yield a dry film for optical waveguides (cladding film with adhesion layer film) having an overall thickness of 110 µm, with a thickness of the plating adhesion layer of 10 µm.

(2) Production of an Optical Material Film (2-1) Production of a Film with Cladding Layer Various components, namely 62 parts by mass of EHPE3150 (by Daicel Chemical Industries, Ltd.), as an epoxy resin being an 1,2-epoxy-4-(2-oxiranyl)cyclohexane adduct of 2,2-bis(hydroxymethyl)-1-butanol, 12 parts by mass of Epiclon 850s (by DIC Ltd.), being a liquid bisphenol A-type epoxy resin, 18 parts by mass of YP50 (by Tohto Kasei Co., Ltd.), being a phenoxy resin, 8 parts by mass of Epotohto YH300 (by Tohto Kasei Co., Ltd.), being a trimethylol propane-type epoxy resin, and 1 part by mass of SP170 (by ADEKA Corp.), being a photocationic curing initiator, were dissolved in a solvent of 30 parts by mass of toluene and 70 parts by mass of MEK, and the resulting solution was filtered using a membrane filter having a pore diameter of 1 µm, followed by vacuum defoaming, to prepare as a result a varnish of a material for a photocurable cladding layer. Then, a PET film (part number A4100), by Toyobo Co., Ltd., was coated with the varnish, using a multi-coater having a comma coater head, by Hirano Tecseed, and the coated film was dried, to yield a 10 µm thick film with cladding layer.

(2-2) Production of a Film with Core Layer

Various fog ululation components, namely 8 parts by mass of Celloxide 2021P (CEL2021P for short, by Daicel Chemical industries, Ltd.), being 3,4-epoxycyclohexenylmethyl-3',4'-epoxycyclohexene carboxylate, 12 parts by mass of EHPE3150 (by Daicel Chemical Industries, Ltd.), as an epoxy resin being an 1,2-epoxy-4-(2-oxiranyl)cyclohexane adduct of 2,2-bis(hydroxymethyl)-1-butanol, 37 parts by mass of Epicoat 1006FS (by Japan Epoxy Resins Co., Ltd.), being a solid bisphenol A-type epoxy resin, 15 parts by mass of VG-3101 (by Mitsui Chemicals, Inc.), being a trifunctional epoxy resin, 18 parts by mass of EPPN201 (by Nippon Kayaku Co., Ltd.), being a solid novolac-type epoxy resin, 10 parts by mass of Epiclon 850s (by DIC Ltd.), being a liquid bisphenol A-type epoxy resin, 1 part by mass of SP170 (by ADEKA Corp.), being a photocationic curing initiator, and 0.1 parts by mass of F470 (by DIC Ltd.), being a surface conditioner, were dissolved in a solvent of 30 parts by mass of toluene and 70 parts by mass of MEK, and the resulting solution was filtered using a membrane filter having a pore diameter of 1 µm, after which the whole was vacuum-defoamed, to prepare as a result a varnish of a material for a core. Then, a PET film (part number A4100), by Toyobo Co., Ltd., was coated with the varnish using a multi-coater having a comma coater head, by Hirano Tecseed, and the coated film was dried, to yield a 40 µm thick film with core layer.

(3) Production of a Photoelectric Composite Wiring Board

A base substrate having an inner layer circuit formed on the surface was produced using "R-1566", by Panasonic.

The cover film of the 10 µm thick film with cladding layer obtained in (2-1) was stripped off, the film with cladding layer was superposed on the base substrate, with the cladding layer facing the substrate, and was affixed to the base substrate, in a vacuum laminator "V-13" by Nichigo-Morton Co., Ltd.) at a temperature of 50° C. and a pressure of 0.3 MPa, for 90 seconds. Thereafter, the whole was irradiated with 2 J/cm$^2$ of UV (365 nm), the carrier (PET) film was stripped off, and a thermal treatment was performed at 150° C. for 30 minutes. The whole was subjected to an oxygen plasma treatment, to cure the film with cladding layer, and form an under-cladding.

Subsequently, the cover film of the film with core layer obtained in (2-2) was stripped off, the film with core layer was superposed on the surface of the under-cladding, with the core material facing the latter, and the whole was laminated under the same conditions as above, in the above vacuum laminator.

A negative mask (having a linear pattern with length of 120 mm and slit width of 40 µm) was placed on the resulting laminate, and the latter was exposed at an intensity of 4 J/cm$^2$, using an ultra-high pressure mercury lamp; the PET film was then stripped off the film with core layer, followed by a thermal treatment for 10 minutes at 140° C.

A developing process was performed using a water-based flux cleaning agent ("Pinealpha ST-100SX", by Arakawa Chemical Industries, Ltd.), adjusted to 55° C., to dissolve and remove thereby the unexposed portion of the photocurable film. Then, the whole was finish-cleaned with water, and blown with air, followed by drying for 10 minutes at 100° C., to form a core. The surface state of the under-cladding, after the developing process performed as described above, was observed visually, and the appearance of the core was observed using a stereomicroscope. As a result, it was found that developing was good, with no resin residue on the surface of the under-cladding, and without voids or peeling of the core from the under-cladding.

Subsequently, micro-mirrors for deflecting guided light by 90° were formed at sites 10 mm from both ends of core. Firstly, V-grooves having a depth of 50 μm were made by feeding a rotating blade (blade "#5000" by DISCO Corporation) having an apex angle of 90° at the cutting edge, across positions at 10 mm from both ends of the core, under conditions of revolutions 10000 rpm and a feed rate of 0.1 mm/s. The varnish "for a cladding layer" was then diluted 50 times with a solvent of 30 parts by mass of toluene and 70 parts by mass of MEK, to yield a solution with which the V-grooves were thinly coated using a brush, followed by drying for 30 minutes at 100° C.; thereafter, the whole was exposed through irradiation of ultraviolet light, under conditions of 1 J/cm$^2$ using a ultra-high pressure mercury lamp, and a thermal treatment was further performed for 10 minutes at 120° C., to smoothen thereby the V-grooves. Thereafter, the core and under-cladding were covered with a metal mask opened only at the portion of the V-grooves, and gold was vacuum-deposited, to form thereby micro-mirrors, in the form of gold thin films, having a thickness of 1000 Å, at the surface of the V-grooves.

The cover film of the dry film in the example obtained in (1) above was stripped off, and the dry film was laminated on the core and under-cladding at 80° C. and at 3 atm in a vacuum laminator "V-130". A mask was placed on the face from which the PET film had been stripped, the face was exposed at an intensity of 2 J/cm$^2$, using an ultra-high pressure mercury lamp, and a thermal treatment was performed for 10 minutes at 140° C., followed by developing in the same way as during formation of the core.

The obtained substrate was immersed for 9 minutes in a swelling solution having a solvent as a main component at a liquid temperature of 80° C. The cross-linked portion of the resin is attacked by the swelling solution, which accordingly facilitates roughening by the subsequent permanganate treatment. After a swelling treatment, a roughened shape was formed through immersion for 30 minutes, in a solution having a permanganate salt as a main component, at liquid temperature of 80° C. followed by immersion for 5 minutes in a neutralization treatment solution, at a liquid temperature of 45° C., to remove the manganese residue. The substrate having undergone the above-described roughening treatment was subjected to a cleaner conditioner step, a soft etching step, and, thereafter, a catalyst step, to elicit thereby adsorption of a catalyst metal that yields nuclei for electroless plating. A Pd—Sn complex is generally used herein as the catalyst metal. Thereafter, a tin salt was dissolved, whereupon metallic palladium was generated as a result of a redox reaction, and electroless copper plating was terminated.

Then, a plating resist was formed at portions where a circuit was not to be formed, and electrolytic copper plating was further performed, followed by stripping of the plating resist and removal of the electroless plating.

Lastly, a thermal treatment was performed for 60 minutes at 180° C., to complete thus a photoelectric composite wiring board having plating adhesion at the surface layer.

(4) Evaluation (4-1) UV Transmittance of the Dry Film of the Example

The UV transmittance of the dry film produced in (1) above was evaluated through measurement of the intensity of ultraviolet rays which was irradiated from an exposure apparatus across the cladding with adhesion layer, using a UV sensor for 313 nm. As a reference, the intensity of the ultraviolet rays was measured in a state where the cladding with adhesion layer was absent. As a result, it was found that UV transmissivity was excellent, with little variation from a UV transmittance of 95% for the cladding with adhesion layer, and 98% in a state where the cladding with adhesion layer was absent.

(4-2) Evaluation of Peel Strength

The peel strength of the surface layer circuit (width 10 mm) produced by plating was measured in accordance with a 90° peel test method (JIS C6481). The results showed the peel strength of 0.5 N/mm, indicative of a photoelectric composite wiring board having excellent adhesion with a metal.

Comparative Example 1

(1) Production of a Dry Film in a Comparative Example

A varnish of a material for an optical waveguide was prepared in the same manner as in Example 1. The prepared cladding layer varnish was applied onto a released-treated surface of a carrier film (PET film (part number TN100) by Toyobo Co., Ltd.), using a multi-coater with a comma coater head, by Hirano Tecseed, followed by drying, to yield a film 45 μm thick. The film was overlaid with an OPP film (OPP-MA420, by Oji Specialty Paper Co. Ltd.), which was used as a cover film, to obtain the dry film (thickness 50 μm) of the comparative example.

In addition, a dry film with cladding layer or a dry film with core layer was produced in the same manner as in Example 1.

(2) Production of a Photoelectric Composite Wiring Board

The same procedure as in Example 1 was performed up to formation of the micro-mirrors, and a photoelectric composite wiring board was obtained in the same manner as in Example 1, except that a dry film (thickness 50 μm) of the comparative example was laminated on the wiring board.

(3) Evaluation of Peel Strength

The peel strength of the surface layer circuit (width 10 mm) produced by plating was measured in accordance with a 90° peel test method (JIS C6481). The peel strength was extremely low, namely 0.06 N/mm.

The dry film for optical waveguides of the present invention was thus found to have excellent adhesion and transparency.

The present international application claims priority based on Japanese Patent Application No. 2013-23976, filed on Feb. 12, 2013, and the entire contents thereof are incorporated herein by reference.

The present invention has been appropriately and sufficiently explained above by way of embodiments, with reference to accompanying drawings and the like, for the purpose of illustrating the invention. A person skilled in the art should recognize, however, that the embodiments described above can be easily modified and/or improved. Therefore, it is understood that any modified embodiments or improved embodiments that a person skilled in the art can arrive at are encompassed within the scope as claimed in the appended claims, so long as these modifications and improvements do not depart from the scope of the claims.

INDUSTRIAL APPLICABILITY

The present invention has wide industrial applicability in the technical field of dry films for optical waveguides and photoelectric composite wiring boards.

The invention claimed is:

1. A dry film for optical waveguides, which is obtained through sequential stacking of a carrier film, a plating adhesion layer, an uncured cladding layer and a cover film,
wherein solid microparticles are dispersed in a resin composition that constitutes the plating adhesion layer, and
an average particle size of the solid microparticles ranges from 0.4 to 5 μm.

2. The dry film for optical waveguides according to claim 1, wherein the resin composition that constitutes the cladding layer is a photocurable resin composition.

3. The dry film for optical waveguides according to claim 1, wherein the resin composition that constitutes the plating adhesion layer is a resin composition that is photocurable and has ultraviolet ray transmissivity.

4. The dry film for optical waveguides according to claim 1, wherein the thickness of the plating adhesion layer ranges from 1 to 10 μm.

5. The dry film for optical waveguides according to claim 1, wherein the plating adhesion layer and the cladding layer are constituted of resin compositions having resins of identical composition.

6. The dry film for optical waveguides according to claim 1, wherein the carrier film has releasability.

7. The dry film for optical waveguides according to claim 1, wherein the solid microparticles are silica particles.

8. An optical waveguide, which is obtained using the dry film according to claim 1.

9. A photoelectric composite wiring board which comprises the optical waveguide according to claim 8.

10. A method for producing a photoelectric composite wiring board, which comprises at least:
stacking the dry film according to claim 1 on a substrate on which a cladding and a core of an optical waveguide are formed;
curing the plating adhesion layer and the uncured cladding layer;
developing simultaneously the plating adhesion layer and the cladding layer;
roughening the surface of the plating adhesion layer; and
forming an electrical circuit.

11. A method for producing a photoelectric composite wiring board, which comprises at least:
stacking a dry film on a substrate on which a cladding and a core of an optical waveguide are formed,
the dry film being obtained through sequential stacking of a carrier film, a plating adhesion layer, an uncured cladding layer and a cover film,
wherein solid microparticles are dispersed in a resin composition that constitutes the plating adhesion layer;
curing the plating adhesion layer and the uncured cladding layer;
developing simultaneously the plating adhesion layer and the cladding layer;
roughening the surface of the plating adhesion layer; and
forming an electrical circuit.

* * * * *